No. 625,890. Patented May 30, 1899.
L. MANN.
EAR RING.
(Application filed Jan. 9, 1899.)
(No Model.)

WITNESSES
C. W. Benjamin

INVENTOR
Louis Mann,
BY
Joseph L. Levy
ATTORNEY

UNITED STATES PATENT OFFICE.

LOUIS MANN, OF NEW YORK, N. Y., ASSIGNOR TO FINK, BODENHEIMER & CO., OF SAME PLACE.

EAR-RING.

SPECIFICATION forming part of Letters Patent No. 625,890, dated May 30, 1899.

Application filed January 9, 1899. Serial No. 701,624. (No model.)

*To all whom it may concern:*

Be it known that I, LOUIS MANN, a citizen of the United States, residing at New York, (Brooklyn,) in the county of Kings, State of New York, have invented certain new and useful Improvements in Gem-Settings, of which the following is a specification.

My invention relates to gem-settings, and specifically to improved means for firmly holding or locking a threaded disk or nut upon a threaded stem or bar, and it has particular reference to locking the guard of an ear ring or screw upon the threaded stem that extends from the setting.

In carrying out my invention I provide a disk or the like having a threaded aperture to receive the threads of a stem or bar, which threaded stem or bar also passes through an aperture in a guiding and clamping piece that is adapted to grip or press upon the bar, so as to keep the disk or nut from working loose upon the same.

In the preferred form of my ear ring or screw I provide a setting with a threaded stem or bar projecting therefrom, with a disk having a threaded aperture, and a pair of spring-acting arms provided with an aperture to receive the stem or bar, which arms are adapted to press upon the latter to keep the threaded disk from rotation upon the same.

The invention also consists in the novel details of improvement and the combinations of parts, that will be more fully hereinafter described and then pointed out in the claims.

Reference is to be had to the accompanying drawings, forming part hereof, wherein—

Figure 1:
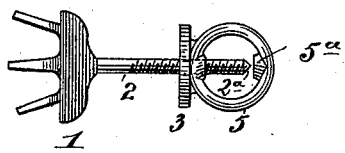
Figure 2:
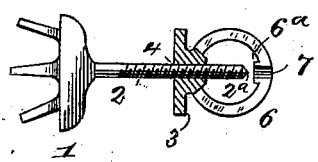
Figure 3:
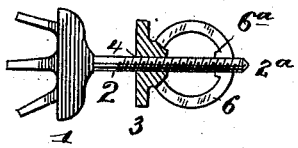
Figure 4:
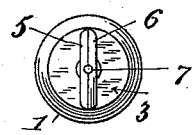
Figure 5:
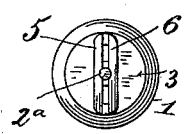
Figure 6:

Figure 1 is a side elevation of an ear-ring embodying my invention. Fig. 2 is a similar view showing the disk in section between the clamping members and the clamping member out of engagement with the threaded stem. Fig. 3 is a similar view showing the clamping member in engagement with said stem. Fig. 4 is an end view of the guard looking from the right in Fig. 1. Fig. 5 is a similar view showing the stem as passed between the clamping members of the guard, and Fig. 6 is an edge view of the guard at right angles to Fig. 1.

Similar numerals of reference indicate corresponding parts in the several views.

In the accompanying drawings, 1 indicates a head or body shown in the form of a setting to receive a stone for an ear-ring, and 2 is a threaded stem or bar projecting from the same, which parts may be of ordinary or suitable construction. 3 is a disk having a threaded aperture 4 to receive the threads of the stem or bar 2, so that it may be screwed on and off the latter in the manner of a nut.

In order to keep the disk 3 from spontaneous rotation upon the stem or bar 2, I provide the disk with means for applying pressure to the stem or bar 2. The means I have shown for this purpose consist of two parallel arms 5 6, extending from the disk 3, the slot between said arms being in alinement with the aperture 4 therein. These arms 5 6 are shown in annular form, and the stem 2 is adapted to pass between them, and in so doing to press them apart, and the spring tension of these arms is such that when they are pressed apart by the stem 2, as in Fig. 5, they will exert a pressure against said stem to grip the same and prevent spontaneous rotation of the disk 3 upon the stem. By preference an aperture 7 is made in the arms 5 6 to receive the stem 2, which is done by making part of the aperture in one arm 5 and the other part of the aperture in the other arm 6, as shown in Fig. 4. In order to make the bearing of the arms against the stem 2 quite long, the inner periphery of each arm 5 6 is provided with a teat $5^a$ $6^a$, as shown in Figs. 1, 2, and 3, and the part of the aperture 7 that lies in the arms 5 6 also extends through the corresponding teat. The arrangement is such that when the disk 3 is screwed upon the stem 2 the stem will pass through the aperture 7 between the gripping-arms 5 6, as shown in Fig. 3, and to enable the stem to conveniently enter the aperture its outer end is tapered at $2^a$.

The gripping-arms 5 6 will be spread apart when the stem passes between them and will exert such a pressure on the stem as to keep the disk from working off of the stem.

The aperture 7 may or may not be threaded, as desired. I find it practical to have the aperture unthreaded.

The particular form of the arms 5 6 that I have illustrated is not essential to my invention, as the gripping-arms may have any suitable shape, provided they extend from the disk in such position as to receive the stem between them and to exert pressure upon the stem. Furthermore, the aperture 7 can be dispensed with; but I find it convenient in such small articles as ear-rings that are made of gold. Furthermore, the position of the arms 5 6 relatively to the stem 2 may be reversed from that shown, as the arms can extend either way from the head or setting, as shown, or toward the same; but by having the disk and arms arranged as shown in the drawings the threaded stem can first be screwed through the disk 3, and then the coacting threads will cause the stem to force its way between the gripping-arms 5 6.

I do not limit my invention to the precise details of construction shown and described, as they may be varied without departing from the spirit thereof.

Having now described my invention, what I claim is—

1. The combination of a threaded stem or bar, with a part 3 having a threaded aperture, and a split ring 5, 6, extending from the part 3 in alinement with said stem, substantially as described.

2. The combination of a threaded stem or bar, with a part 3 having a threaded aperture, a split ring or frame 5, 6, extending from the part 3, and an aperture formed in the ends of the sections of the ring in alinement with the stem and adapted to grip the latter, substantially as described.

3. The combination of a threaded stem or bar, with a part 3 having a threaded aperture, a split ring or frame 5, 6, extending from the part 3, and an apertured enlargement formed in the ends of the sections of the ring in alinement with the stem and adapted to grip the latter, substantially as described.

4. The combination of a threaded stem or bar, with a part 3 having a threaded aperture, a split ring or frame 5, 6, extending from the part 3, and an aperture formed in the ends of the sections of the ring in alinement with the stem and adapted to grip the latter, the stem having a tapered end $2^a$ to expand said arms at said aperture, substantially as described.

Signed in the city, county, and State of New York this 7th day of January, 1899.

LOUIS MANN.

In presence of—
  WM. JACOBSEN,
  S. BEATRICE KUHN.